(12) United States Patent
Wojno

(10) Patent No.: US 9,776,495 B2
(45) Date of Patent: Oct. 3, 2017

(54) ACTIVE MOUNTING SYSTEM FOR VEHICLE TRANSFER CASE

(71) Applicant: GM Global Technology Operations LLC, Detroit, MI (US)

(72) Inventor: Robert M. Wojno, Newtown, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/982,201

(22) Filed: Dec. 29, 2015

(65) Prior Publication Data

US 2017/0182876 A1 Jun. 29, 2017

(51) Int. Cl.
| | | |
|---|---|---|
| *B60K 5/12* | (2006.01) | |
| *B60K 17/24* | (2006.01) | |
| *B62D 63/02* | (2006.01) | |
| *B60K 6/40* | (2007.10) | |

(52) U.S. Cl.
CPC .............. *B60K 5/1283* (2013.01); *B60K 6/40* (2013.01); *B60K 17/24* (2013.01); *B62D 63/02* (2013.01); *B60Y 2200/92* (2013.01); *Y10S 903/951* (2013.01)

(58) Field of Classification Search
CPC .. B60G 17/017; B60G 2400/95; B60K 17/22; B60K 17/24; B60K 5/10
See application file for complete search history.

(56) References Cited

U.S. PATENT DOCUMENTS

| | | | | |
|---|---|---|---|---|
| 1,755,126 A * | 4/1930 | Martin | ..................... | B60K 5/10 180/298 |
| 3,710,885 A * | 1/1973 | Brown | ..................... | B60K 5/10 180/294 |
| 4,276,952 A * | 7/1981 | Kuhfuss, Jr. | ............. | B60K 5/10 180/294 |
| 4,534,442 A * | 8/1985 | Botar | ....................... | B60K 5/06 180/294 |
| 4,770,427 A * | 9/1988 | Howell | .................... | B60K 5/10 137/576 |
| 4,966,251 A * | 10/1990 | Hirano | ................... | B60K 17/24 180/338 |
| 5,101,928 A * | 4/1992 | O'Connor | ................ | B60K 5/10 180/291 |
| 5,137,108 A * | 8/1992 | Knowlton | ................ | B60K 5/10 180/298 |
| 5,419,131 A * | 5/1995 | Doppstadt | ............... | F02B 63/00 180/298 |
| 6,050,358 A * | 4/2000 | Kays | ........................ | B60K 5/12 16/358 |
| 6,345,680 B1 * | 2/2002 | Hill | ........................ | B60K 17/24 180/209 |
| 6,345,826 B1 * | 2/2002 | Kurzeja | ................... | B60G 9/00 280/5.5 |

(Continued)

*Primary Examiner* — Katy M Ebner
(74) *Attorney, Agent, or Firm* — Cantor Colburn LLP

(57) ABSTRACT

An active mounting system for a transfer case in a vehicle drivetrain is provided. The system includes a chassis movable between a first position and a second position. An engine is pivotally coupled to the chassis. A transmission is coupled to the engine. A prop-shaft is operably coupled to the transmission with a transfer case coupled in between. An active mount is operably coupled to selectively rotate the engine and transmission between a first orientation and a second orientation in response to the chassis being moved from the first position to the second position.

14 Claims, 4 Drawing Sheets

(56) References Cited

U.S. PATENT DOCUMENTS

| | | | |
|---|---|---|---|
| 6,490,540 B1* | 12/2002 | Kurzeja | B60G 17/0152 |
| | | | 702/151 |
| 6,755,763 B1 | 6/2004 | Goto et al. | |
| 6,758,302 B2* | 7/2004 | Penzotti | B60K 17/22 |
| | | | 180/379 |
| 6,811,455 B2* | 11/2004 | Rodriguez | F16F 15/02 |
| | | | 180/376 |
| 6,918,600 B2* | 7/2005 | Dodd | B60G 17/0155 |
| | | | 280/124.16 |
| 6,959,932 B2* | 11/2005 | Svartz | B60G 9/003 |
| | | | 280/124.157 |
| 6,969,334 B2 | 11/2005 | Schleuder et al. | |
| 7,029,014 B2* | 4/2006 | Hamm | B60G 7/006 |
| | | | 267/265 |
| 7,360,358 B1 | 4/2008 | Phanco et al. | |
| 7,660,710 B2* | 2/2010 | Sirrine | G01M 13/02 |
| | | | 703/6 |
| 8,042,642 B2 | 10/2011 | Marsh et al. | |
| 8,047,323 B2 | 11/2011 | Downs et al. | |
| 8,381,861 B2 | 2/2013 | Zink | |
| 8,584,785 B2 | 11/2013 | Marsh et al. | |
| 8,646,566 B1* | 2/2014 | Bouzit | B60K 17/24 |
| | | | 180/376 |
| 8,851,491 B2* | 10/2014 | Bouzit | B60K 17/24 |
| | | | 180/376 |
| 2006/0267296 A1* | 11/2006 | Dodd | B60G 11/27 |
| | | | 280/5.512 |
| 2008/0021620 A1* | 1/2008 | Johansson | B60K 17/24 |
| | | | 701/49 |
| 2017/0015185 A1* | 1/2017 | Uranaka | B62D 21/02 |

* cited by examiner

ACTIVE MOUNTING SYSTEM FOR VEHICLE TRANSFER CASE

FIELD OF THE INVENTION

The subject invention relates to a vehicle having a mounting assembly for a transfer case, and more particularly, to a system for actively changing the position of the transfer case in response to a change in the driveline angles.

BACKGROUND

Vehicles, such as automobiles and trucks for example, include a driveline having a prop-shaft and a transfer-case. The prop-shaft transmits rotational energy (torque) developed by the vehicle engine to the front and rear drive modules via the transfer case. The drive modules in turn transmit the rotational energy to the wheels.

It should be appreciated that the transmission of rotational energy from the prop-shaft to the drive modules, and from the drive modules to the wheels generates reaction forces within the drive modules to counter the transmitted torque. The geometric arrangement of the driveline and drive modules is configured to reduce undesired noise and vibration that may be caused by these reaction forces. One factor that impacts noise and vibration is the angle of the prop-shaft relative to the transfer case and the rear drive module.

In some vehicles, such as off-road capable vehicles, the operator may desire to "lift" the vehicle to increase ground clearance. The lifting of the vehicle moves the vehicle chassis or frame away from the ground. This may be accomplished using several means known in the art, such as an air suspension, a hydraulic suspension, torsion bars or spacers for example. In some instances, such as air suspension and hydraulic suspension for example, the amount of lift may be actively changed by the operator.

The maximum amount of lift that may be achieved on a given vehicle is controlled at least partially by the angle of the prop-shaft. It should be appreciated that as the vehicle is lifted, the transfer case moves with the vehicle chassis away from the ground. However, the wheels and associated rear drive module remain effectively at the same vertical height. As a result, the angle of the prop-shaft will increase as the lifted height of the vehicle is increased. Therefore, the amount of lift a vehicle may achieve is limited by the angle of the prop-shaft to avoid undesired noise and vibration as well as strain on joints and seals of the transfer case and rear drive module.

Accordingly, it is desirable to provide a system that allows the vehicle lift to be actively changed by the operator while avoiding undesired noise and vibration.

SUMMARY OF THE INVENTION

In one exemplary embodiment of the invention, a vehicle is provided. The vehicle comprises a chassis movable between a first position and a second position. An engine is pivotally coupled to the chassis. A transmission is coupled to the engine. A prop-shaft is operably coupled to the transmission. An active mount is operably coupled to selectively rotate the engine and transmission between a first orientation and a second orientation in response to the chassis being moved from the first position to the second position.

In another exemplary embodiment of the invention, a system for changing the orientation of an engine, transmission and transfer case assembly is provided. The system comprises a pivot coupling the engine to a vehicle chassis. A mount is coupled to the transfer case. An actuator is operably coupled to the chassis. A linkage is operably coupled between the mount and the actuator, wherein the linkage moves the mount in response to the activation of the actuator.

In accordance with another exemplary embodiment of the invention, a method of changing the orientation of a drivetrain is provided. The method comprises providing a drivetrain having an engine, a transmission and a transfer case. The engine is mounted to a chassis by a pivot. An active mount is coupled between the transfer case and the chassis. The vertical distance is changed between the chassis and the ground. The drivetrain is rotated about the pivot with the active mount in response to the changing of the vertical distance.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
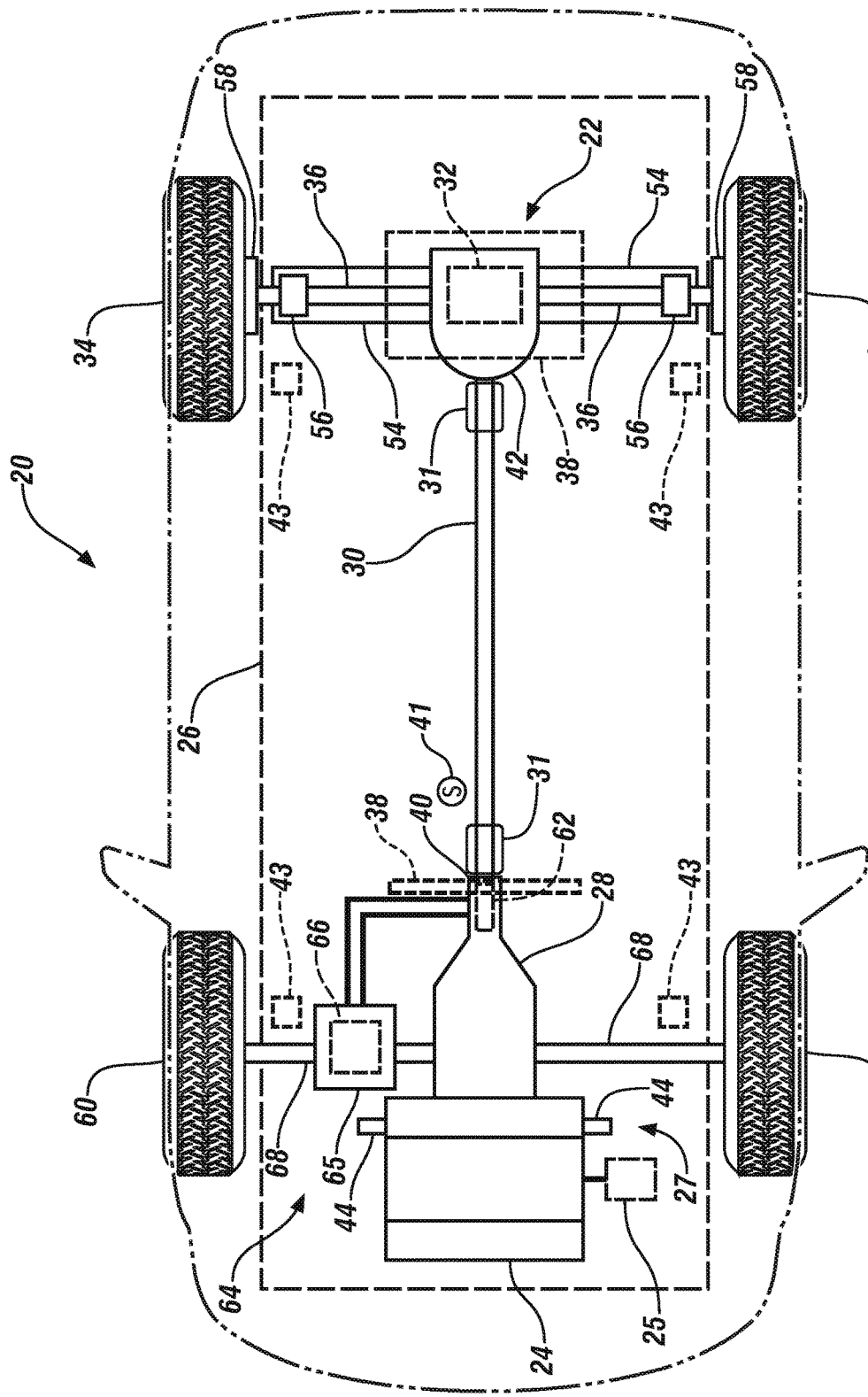
FIG. 1 is a schematic plan view of a vehicle having a rear drive module in accordance with an embodiment of the invention.
Figure 2:
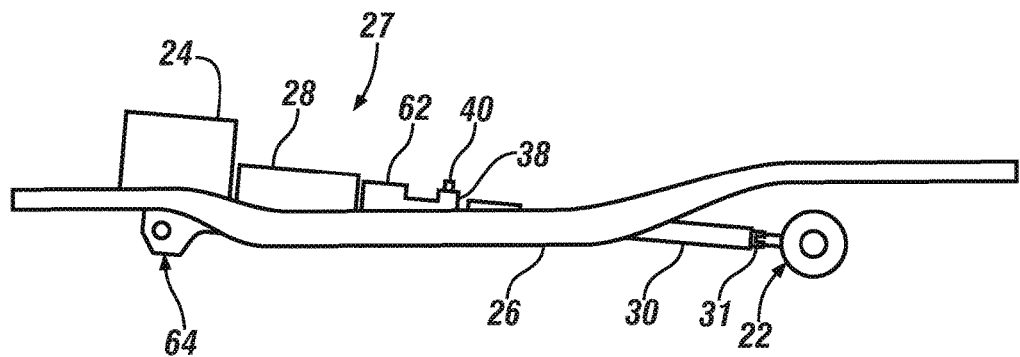
FIG. 2 is a side view of a portion of the vehicle of FIG. 1 in a normal or lowered operating mode.

The following description is merely exemplary in nature and is not intended to limit the subject disclosure, its application or uses. It should be understood that throughout the drawings, corresponding reference numerals indicate like or corresponding parts and features.

In accordance with an embodiment of the invention, FIG. 1 illustrates a vehicle 20 having a front drive module 64 and rear drive module (RDM) 22. It should be appreciated that the vehicle 20 may be an automobile or a truck for example. The vehicle 20 may include an engine 24, such as a gasoline or diesel fueled internal combustion engine. The engine 24 may further be a hybrid type engine that combines an internal combustion engine with an electric motor for example. In one embodiment, the vehicle 20 includes a controller or control module 25.

The engine 24 and drive modules 22, 64 are coupled to a vehicle structure such as a chassis or frame 26. The engine 24 is coupled to the RDM 22 by a transmission 28, a transfer case 62 and a prop-shaft 30. In the exemplary embodiment, the engine 24, transmission 28 and transfer case 62, collectively referred to herein as the drivetrain 27, are rigidly coupled together (e.g. bolted face to face). The transmission 28 may be configured to reduce the rotational velocity and increase the torque of the engine output. This modified output is then transmitted to the RDM 22 via the transfer case 62 and prop-shaft 30. The RDM 22 transmits the output torque from the prop-shaft 30 to a pair of driven-wheels 34 via axles 36 and wheel flanges 58. On either end of the prop-shaft 30 may be a rotational joint 31, sometimes referred to as a universal joint. The universal joint 31 allows the prop-shaft 30 to assume an angle relative to the output of the transfer case 62 or the RDM 22 while still transmitting torque.

As will be discussed in more detail herein, the transfer case 62 is mounted to the chassis 26 through a frame member 38 that supports an active mount 40. The active mount 40 is operably coupled between the frame member 38 and the transfer case 62 to change the vertical position of the transfer case 62 in response to a change in the vertical height or lift of the chassis 26. The change in vertical height of the chassis 26 may be due to a change in the setting of a suspension system 43. As discussed above, the suspension system 43 may be configured to allow the operator to change an amount of lift or vertical distance of the chassis from the ground. The suspension system may be pneumatic, hydraulic, mechatronic or a mechanical (e.g. torsion bar) arrangement. The change in lift by the suspension system 43 may be selectively activated or manually engaged by the operator, in one embodiment the suspension system 43 is automatically activated by the control module 25 in response to predetermined events.

The active mount 40 may operate using a pneumatic, hydraulic, mechatronic or electric motor powered actuator for example. The active mount 40 may be coupled to receive a signal from the control module 25. In another embodiment, the active mount 40 operates independently in response to a signal from a sensor, such as a sensor 41 that measures the angle of the prop-shaft 30 relative to the transfer case 62 for example. In still another embodiment, the active mount 40 may be manually actuated and locked by the vehicle operator without input from a sensor.

In one embodiment, the RDM 22 includes a housing 42 such as a differential housing that supports a hypoid gear set 32. As used herein, the hypoid gear set 32 includes a ring gear, a pinion gear and a differential case. The differential case may include a differential gear set assembly as is known in the art for transmitting torque from the ring gear to the axles. In one embodiment, a pair of axle tubes 54 is coupled to and extends from the housing 42. One or more wheel bearings 56 may be disposed at an end of the axle tubes 54 distal from the differential housing 42 to support the axles 36. It should be appreciated that in other embodiments, the RDM 22 may have other configurations than a hypoid gear set.

The vehicle 20 further includes a front or second set of wheels 60 arranged adjacent the engine 24 and configured to receive output from the engine 24 via the transfer case 62. This is sometimes referred to as a four-wheel or an all-wheel drive configuration. The transfer case 62 divides the output from the transmission 28 between the front and rear driven wheels 60, 34 respectively. The transfer case 62 transmits a portion of the output to the front drive module 64, which may include additional components such as a differential housing 65, a hypoid or differential gear set 66 and shafts 68 that transmit the output to the wheels 60.

Figure 3:
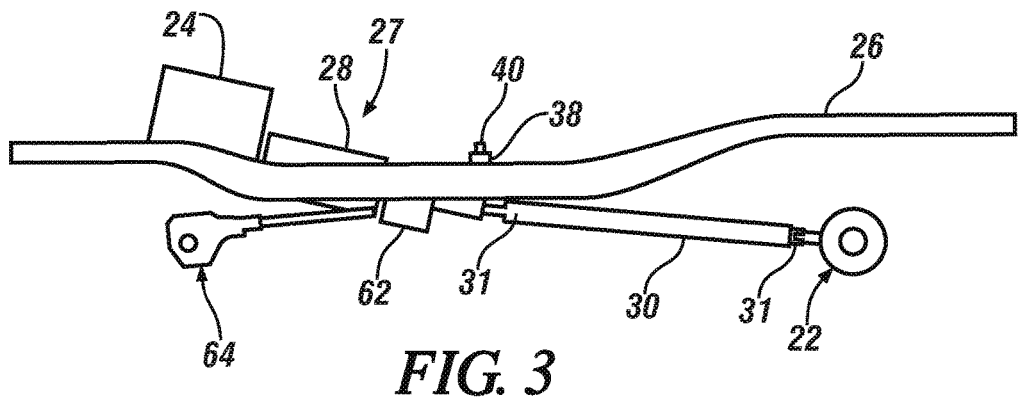
FIG. 3 is a side view of a portion of the vehicle of FIG. 1 in a lifted or raised operating mode.
Figure 4:
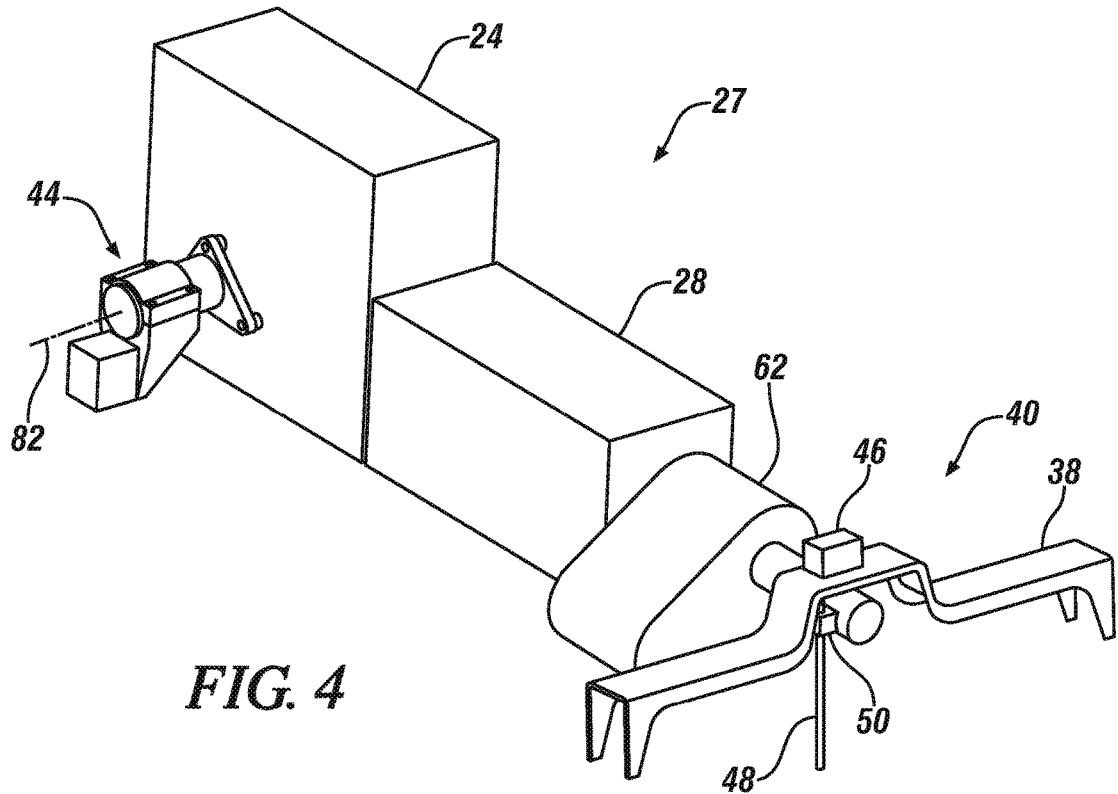
FIG. 4 is perspective view of a portion of the driveline of the vehicle of FIG. 1 in a normal or lowered operating mode.
Figure 5:
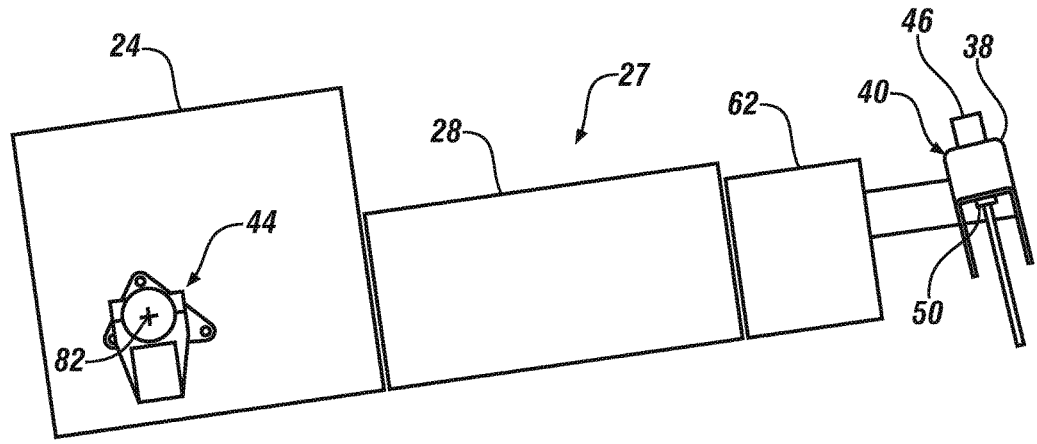
FIG. 5 is a side view of the driveline of FIG. 4.
Figure 6:
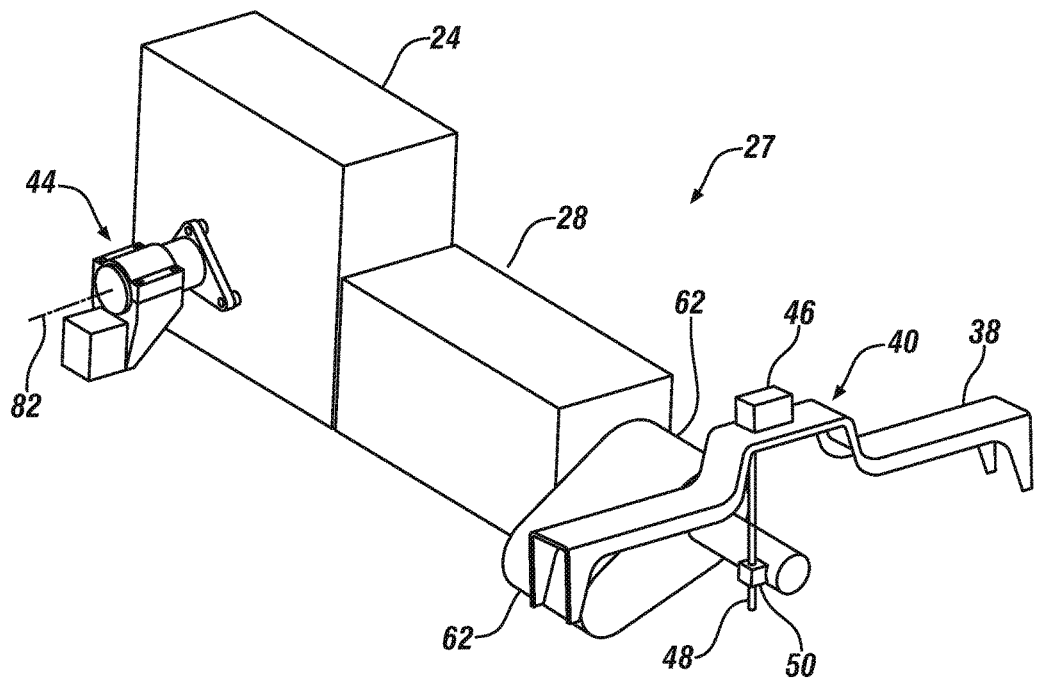
FIG. 6 is a perspective view of a portion of the driveline of the vehicle of FIG. 1 in a lifted or raised operating mode.
Figure 7:
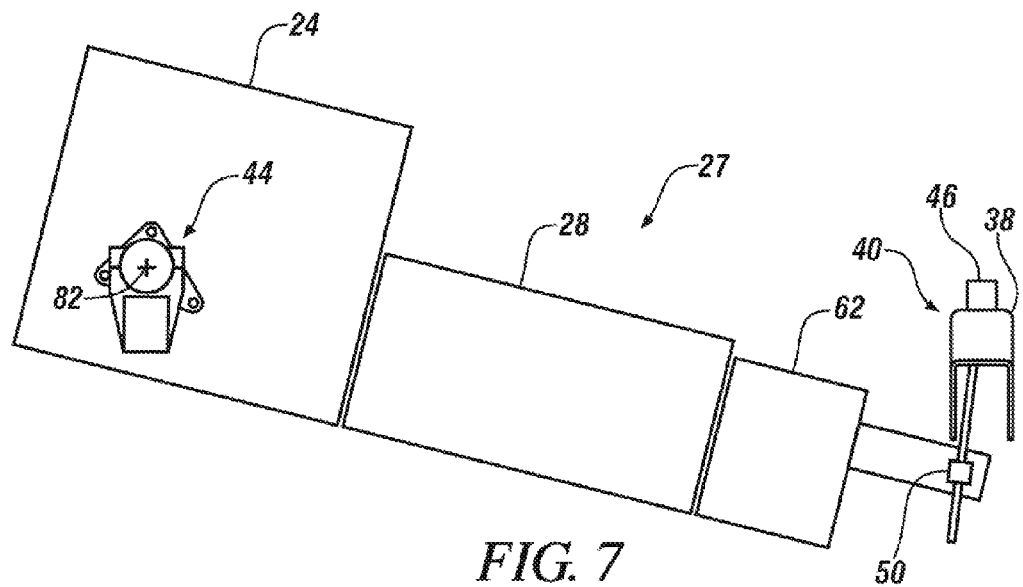
FIG. 7 is a side view of the driveline of FIG. 6.

Referring now to FIGS. 2-6, with continuing reference to FIG. 1, the system for changing the angular orientation of the drivetrain 27 using the active mount 40 will be described. In the exemplary embodiment, the engine 24 is mounted to the chassis 26 via a pivot 44. This allows the drivetrain 27 to change its angular orientation when the chassis 26 is moved between a normal or lowered position (FIG. 2, 4, 5) and a lifted or raised position (FIG. 3, 6, 7). It should be appreciated that while embodiments herein describe the angular orientation of the drivetrain 27 at two chassis 26 positions (normal and lifted), the claimed invention should not be so limited and in some embodiments the chassis 26 may be configured at any vertical position between the normal and lifted positions.

In one embodiment, the active mount 40 consists of an actuator 46 that is coupled to the frame member 38. A linkage 48 couples the actuator 46 to a mount 50 on the transfer case 62. In an embodiment the linkage 48 is a threaded rod or power screw and the mount 50 includes a ball screw that cooperates with the threaded rod. As the threaded rod is rotated by the actuator 46, the mount 50 travels along the length of the linkage 48. In one embodiment, when the mount 50 is adjacent the frame member 38, the chassis 26 is in the normal position (FIG. 2) with the drivetrain 27 substantially aligned with the prop-shaft 30. When the mount 50 travels to an opposing end of the linkage 48, the chassis 26 is in the lifted position (FIG. 3). As the chassis 26 is lifted, the angle of the prop-shaft 30 relative to the transfer case changes to accommodate the change in vertical height.

Since the components of the drivetrain 27 are substantially rigidly coupled together, as the mount 50 moves along the linkage 48, the drivetrain 27 will rotate as a single unit about the pivot 44. It should be appreciated that by rotating the drivetrain 27, the angle between the prop-shaft 30 and the transfer case 62 will be smaller than it would otherwise be without the active mount 40. This provides advantages in allowing an increase in the amount of vertical lift of the chassis 26 than could otherwise be achieved.

Figure 8:
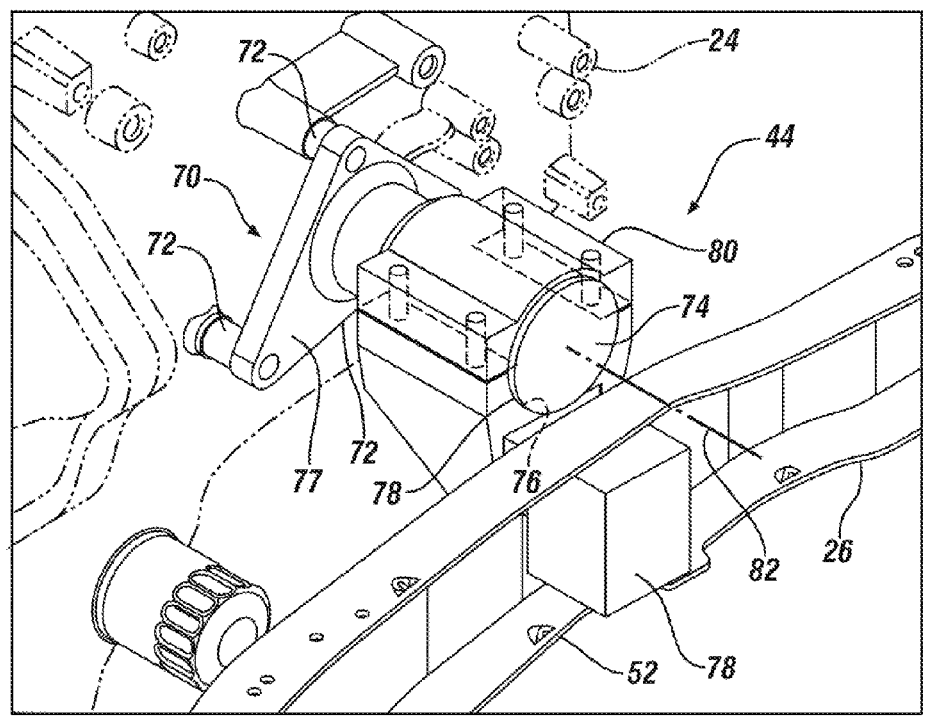
FIG. 8 is a perspective view of the engine pivot mount for the vehicle of FIG. 1.

Referring now to FIG. 8, an embodiment is shown of the pivot 44. In this embodiment, the pivot 44 is an engine mount that couples the engine 24 to a portion 52 of the chassis 26. In this embodiment, the pivot 44 includes a triangularly shaped bracket 70 that includes a plurality of standoffs 72 that are configured to mate with the engine 24. In one embodiment, the standoffs 72 each include a hole that receives a bolt (not shown). A cylindrical protrusion 74 extends from a planar side 77 of the bracket 70.

The protrusion 74 is received in a journal 76 of mount member 78. The protrusion 74 is captured in the journal 76 by an end bracket 80. The end bracket 80 is coupled to the mount member 78 to retain the protrusion 74. The mount member 78 may be made from a suitable material, such as an elastomeric material for example, for damping vibrations from the engine 24 and reduce the transmission of the vibrations to the chassis portion 52. The protrusion 74 cooperates with the journal 76 and end bracket 80 to define an axis of rotation 82 that the drivetrain 27 rotates about in response to the mount 50 moving along the linkage 48.

In operation, the operator may desire additional ground clearance to allow a vehicle 20 to traverse a particular terrain. To facilitate driving, the operator may elect to lift the chassis 26. This may be done manually, such as by actuating a torsion bar for example. Alternatively, the lifting operation may be performed automatically or semi-automatically. In one embodiment, the operator may activate the suspension system 43 by actuating a button or selector within the vehicle cabin. When the control module 25 determines that the button or selector has been activated, control operations may be initiated that cause the suspension system 43 to move from a normal state (FIG. 2) to a raised or lifted state (FIG. 3). In one embodiment, the operator may be able to indicate the amount of lift that is desired.

The control module 25 may further transmit a signal to activate the actuator 46 causing the angle of the engine 24, transmission 28 and transfer case 62 to pivot about the axis 82. The amount of movement by the mount 50 along the linkage 48 will vary, based at least in part, on the amount of lift created by the suspension system 43. In one embodiment, the actuator 46 is activated by sensor 41 that measures the angle between the transfer case 62 and the prop-shaft 30. It should be appreciated that the movement of the mount 50 along the linkage 48 may occur simultaneously with the lifting of the chassis 26 by the suspension system 43. In one embodiment, the movement of the mount 50 may occur synchronously or asynchronously with the movement of the chassis 26.

When the operator desires to either reduce the amount of lift or return to a normal state, the process is reversed with the mount 50 moving the opposite direction (e.g. toward the frame member 38) along the linkage 48 as the vertical height of the chassis 26 is lowered. The movement of the mount 50 may be synchronous or asynchronous with the movement of the chassis 26.

Embodiments of the invention provide advantages in increasing the amount of lift or vertical height that may be achieved over that of a fixed mount transfer case. The amount of lift that may be achieved is increased without having undesirable noise and vibration.

It should be appreciated that while embodiments herein describe the linkage as a threaded rod or a power screw, this is for exemplary purposes and the claimed invention should not be so limited. In other embodiments, the linkage may be a piston/cylinder arrangement that operates on hydraulic or pneumatic pressure for example. In still other embodiments, the actuator 46 may be a linear actuator (e.g. a solenoid), an electrical motor, a hydraulic motor or a pneumatic motor for example. In still other embodiments, the actuator and linkage may be a shape memory alloy that operates in response to heat, magnetic fields or electrical current for example.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle comprising:
a chassis movable between a first position and a second position;
an engine pivotally coupled to the chassis;
a transmission coupled to the engine;
a prop-shaft operably coupled to the transmission; and
an active mount operably coupled between the chassis and the transmission to selectively rotate the engine and the transmission between a first orientation and a second orientation in response to the chassis being moved from the first position to the second position.

2. The vehicle of claim 1 further comprising a transfer case disposed between the transmission and the prop-shaft.

3. The vehicle of claim 2 wherein the active mount is coupled to the transfer case.

4. The vehicle of claim 3 wherein the active mount includes an actuator operably coupled to the chassis and a linkage, the linkage being operably coupled between the actuator and the transfer case.

5. The vehicle of claim 4 further comprising a mount coupled to the transfer case, wherein the linkage is threaded rod coupled to the mount.

6. The vehicle of claim 4 wherein the actuator is a hydraulic, pneumatic, mechatronic or electrical actuator.

7. The vehicle of claim 1 further comprising:
a mount member coupled to the chassis; and
a bracket coupled to the engine, the bracket having a cylindrical protrusion thereon, the cylindrical protrusion being rotationally coupled to the mount member.

8. The vehicle of claim 4 further comprising a suspension system configured to move the chassis between the first position and the second position.

9. The vehicle of claim 8 further comprising a controller operably coupled to the suspension system and the actuator, the controller configured to activate the actuator in response to the suspension system moving the chassis from the first position to the second position.

10. The vehicle of claim 9 wherein the controller is further configured to activate the actuator simultaneously with the suspension system moving the chassis from the first position to the second position.

11. The vehicle of claim 8 further comprising a sensor configured to determine an angle of the prop-shaft, wherein the sensor is further configured to transmit a signal to the actuator in response to the angle being larger than a predetermined angle.

12. A system for changing an orientation of an engine, transmission and transfer case assembly, the system comprising:
a pivot coupling an engine to a vehicle chassis;
a mount coupled to a transfer case;
an actuator operably coupled to the vehicle chassis; and
a linkage operably coupled between the mount and the actuator, wherein the linkage moves the mount in response to the activation of the actuator.

13. The system of claim 12 wherein the linkage is a threaded rod and the mount includes a ball screw sized to engage the threaded rod.

14. The system of claim 13 wherein the actuator is a hydraulic, pneumatic, mechatronic or electrical actuator.

* * * * *